United States Patent [19]

Katayose et al.

[11] Patent Number: 4,930,068

[45] Date of Patent: May 29, 1990

[54] DATA PROCESSOR HAVING DIFFERENT INTERRUPT PROCESSING MODES

[75] Inventors: Tsuyoshi Katayose; Yukio Maehashi, both of Tokyo, Japan

[73] Assignee: NEC Corporation, Tokyo, Japan

[21] Appl. No.: 118,671

[22] Filed: Nov. 9, 1987

[30] Foreign Application Priority Data

Nov. 7, 1986 [JP] Japan .................................. 61-265856
Nov. 7, 1986 [JP] Japan .................................. 61-265858

[51] Int. Cl.$^5$ ............................................. G06F 13/00
[52] U.S. Cl. .................................. 364/200; 364/230.2; 364/280.8; 364/941
[58] Field of Search ................ 364/200 MS File, 900, 364/MS File

[56] References Cited

U.S. PATENT DOCUMENTS

| | | | |
|---|---|---|---|
| 3,771,146 | 11/1973 | Cotton et al. | 364/200 |
| 4,218,739 | 8/1980 | Negi et al. | 364/200 |
| 4,296,466 | 10/1981 | Guyer et al. | 364/200 |
| 4,315,314 | 2/1982 | Russo | 364/200 |
| 4,438,489 | 3/1984 | Heinrich et al. | 364/200 |
| 4,438,492 | 3/1984 | Harmon, Jr. et al. | 364/200 |
| 4,459,657 | 7/1984 | Murao | 364/200 |
| 4,484,271 | 11/1984 | Miu et al. | 364/200 |
| 4,646,578 | 4/1987 | Chilinski et al. | 364/200 |

*Primary Examiner*—Thomas M. Heckler
*Assistant Examiner*—Gopal C. Ray
*Attorney, Agent, or Firm*—Foley & Lardner, Schwartz, Jeffery, Schwaab, Mack, Blumenthal & Evans

[57] ABSTRACT

A data processor comprises an interrupt processing request controller receiving processing requests from peripheral devices for generating an interrupt request. An execution unit has a first mode of executing the interrupt processing in accordance with a user's program and a second mode of executing the interrupt processing in accordance with a microprogram while maintaining an internal condition concerning execution of a program. The controller operates to selectively inhibit the execution of the interrupt processing in the first mode, but to basically allow the execution of the interrupt processing in the second mode.

12 Claims, 8 Drawing Sheets

DATA PROCESSOR HAVING DIFFERENT INTERRUPT PROCESSING MODES

BACKGROUND OF THE INVENTION

1. Field of the Invention

The present invention relates to a data processor, and more specifically to a microcomputer capable of processing a processing request from various peripheral devices and internal circuits in different interrupt processing modes in accordance with the type of the requested processing.

2. Description of related art

Recent advancements in semiconductor technology have realized one microcomputer formed on a single semiconductor chip. In addition, various peripheral devices and internal circuits such as a timer counter, an analog/digital converter, and a serial transmission/reception circuit have been developed, and are provided to the microcomputer in an actual use, so that a high level of function is realized. As a result, a central processing unit (called "CPU" hereinafter) are required not only to execute data processing in accordance with a designated program at a high speed, but also to effectively and speedily comply with a processing request from the peripheral devices and internal circuits.

Heretofore, a processing called "interrupt" has been widely adopted to allow the CPU to effectively process the operation requests from internal circuits and peripheral devices. In the interrupt, if the CPU detects a processing request from a peripheral device or the like, the current sequence of program is temporarily suspended, and a sequence appropriate to the interrupt request is exectued.

In general, it is frequently required that certain specific processing is preferentially exectued as compared with other processings without regard to the current program being exectued by the CPU. Such interrupt requests will occur at random. Therefore, the CPU is adapted to check, at a final machine cycle of each instruction execution cycle, whether or not an interrupt request is generated. If the interrupt request is detected, the CPU interrupts the processing of the current program being executed, and starts the interrupt processing. At this time, the contents of a program counter, flags and various registers are saved to a stack, so that the status of the interrupted program is preserved without being broken. After completion of the interrupt processing, the saved information is restored to the original counter, flags and registers, so that the suspended program is restarted.

Further, in the case that a plurality of interrupt processing requests should be handled, a vector interrupt method has been used. In this method, in order to select one program appropriate to an interrupt request from among a plurality of interrupt processing programs, selection data or vectors are respectively assigned to peripheral devices and an interrupt request circuit. The interrupt vectors specify a head address of respective interrupt routines held in a program memory. Therefore, a branch destination address is determined on the basis of the vector value supplied after the interrupt request, so that the operation is branched to the interrupt processing routine.

In addition, in some cases it is necessary to inhibit an acknowledge of interrupt request in view of a current processing being executed. For example, one case is that a processing for another interrupt is being executed. Another case is that a stack should be avoided from being further deepened. A third case is that the content of a stack is being handled under a direct instruction. In order to comply with such situations, there is provided an interrupt enable flag (called "EI flag" hereinafter) which is set when an interrupt processing can be allowed and is reset when an interrupt processing is already being executed or when an interrupt should be inhibited. In ordinary cases, this EI flag is adapted to be automatically reset in a hardware manner when an interrupt processing is started, and therefore, should be set in the course of a restoring processing from the interrupt processing.

In the above mentioned interrupt processing, in order to ensure the return to the original program being executed before the start of an interrupt, it is inevitably required to execute the saving of various registers before the start of interrupt, the resetting of the EI flag, the branching to the interrupt processing program, the restoring of the saved information after the completion of interrupt, and the setting of the EI flag. In other words, a large amount of overhead including the above specified processings is required other than the processing of a required interrupt processing program.

Further, in the course of execution of a vector interrupt processing program, even if there is generated a request of a simple processing such as a date transfer between a memory and a peripheral device, it cannot be handled because of the limit of a stack area.

In view of the above, in various microcomputer application systems receiving a number of different processing requests from a plurality of processing request generation sources for a short time period, the requested processings could not be executed effectively at a high speed.

SUMMARY OF THE INVENTION

Accordingly, it is an object of the present invention to provide a data processor which has overcome at least one of the above mentioned drawbacks.

Another object of the present invention is to provide a data processor capable of processing an interrupt operation without saving the content of various registers.

A further object of the present invention is to provide a data processor capable of effectively handling various interrupt processings at a high speed.

A still further object of the present invention is to provide a data processor capable of handling various interrupt processing without decreasing the execution efficiency.

The above and other objects of the present invention are achieved in accordance with the present invention by a data processor comprising in interrupt processing request controller receiving processing requests from peripheral devices for generating an interrupt processing request, a memory storing programs and processing data, a special register unit for controlling the peripheral devices and internal circuits and managing data transfer, an execution unit having a first mode of executing the interrupt processing in accordance with a user's program and a second mode of executing the interrupt processing in accordance with a microprogram while maintaining an internal condition concerning execution of a program, a control means unit for selectively inhibiting the execution of the interrupt processing in the first mode, and a unit for designating the operation control of the peripheral device and in address of the special register unit in the execution of the interrupt processing in the second mode.

As seen from the above, the interrupt processing is executed in the two modes. The first mode corresponds to a conventional interrupt processing in which an interrupt request is processed in accordance with a user's program. This first mode will be called a "vector interrupt" hereinafter. In the second mode, on the other hand, a series of data processings such as data transfer, data exchange, and data updating (increment, decrement, inversion, etc.) are executed by using the special register unit (which is used as a data buffer for designating operation of peripheral devices and internal circuits and for transferring data between various circuits) and a read/write memory (called "RAM" hereinafter) but without using the user's program. This second mode will be called "macroservice" hereinafter). More specifically, in the macroservice, if the interrupt request is generated, the execution of the current program is interrupted and an ordinary program execution operation of the CPU is stopped. Then, the data processing is executed in a condition in which various internal status of the CPU and data in various register are maintained as they are. In other words, the macroservice can be realized by utilizing the existing hardware resources of the CPU, and therefore, it is not necessary to add a special hardware such as FIFO and DMA circuit. After the macroservice is completed, the CPU restarts to execute the interrupted program on the basis of retained status and data. Therefore, it can be seen from the viewpoint of software that the program is not interrupted and another instruction is automatically inserted into the process of the program execution. Accordingly, the macroservice makes it possible to minimize the frequency of the vector interrupts which needs the saving and restoring of the internal status information. Specifically, the macroservice will decrease a load of software processings. For example, a simple data processing between a buffer area of a memory and a special register of a peripheral device, such as a reading of a conversion value from an A/D converter, and a writing of a received data from a serial bus interface to a memory, which have been executed by the vector interrupt in the conventional system, can be effectively executed at a high speed by the macroservice.

The above and other objects, features and advantages of the present invention will be apparent from the following description of the preferred embodiments of the invention with reference to the accompanying drawings.

DESCRIPTION OF THE PREFERRED EMBODIMENTS

Figure 1:
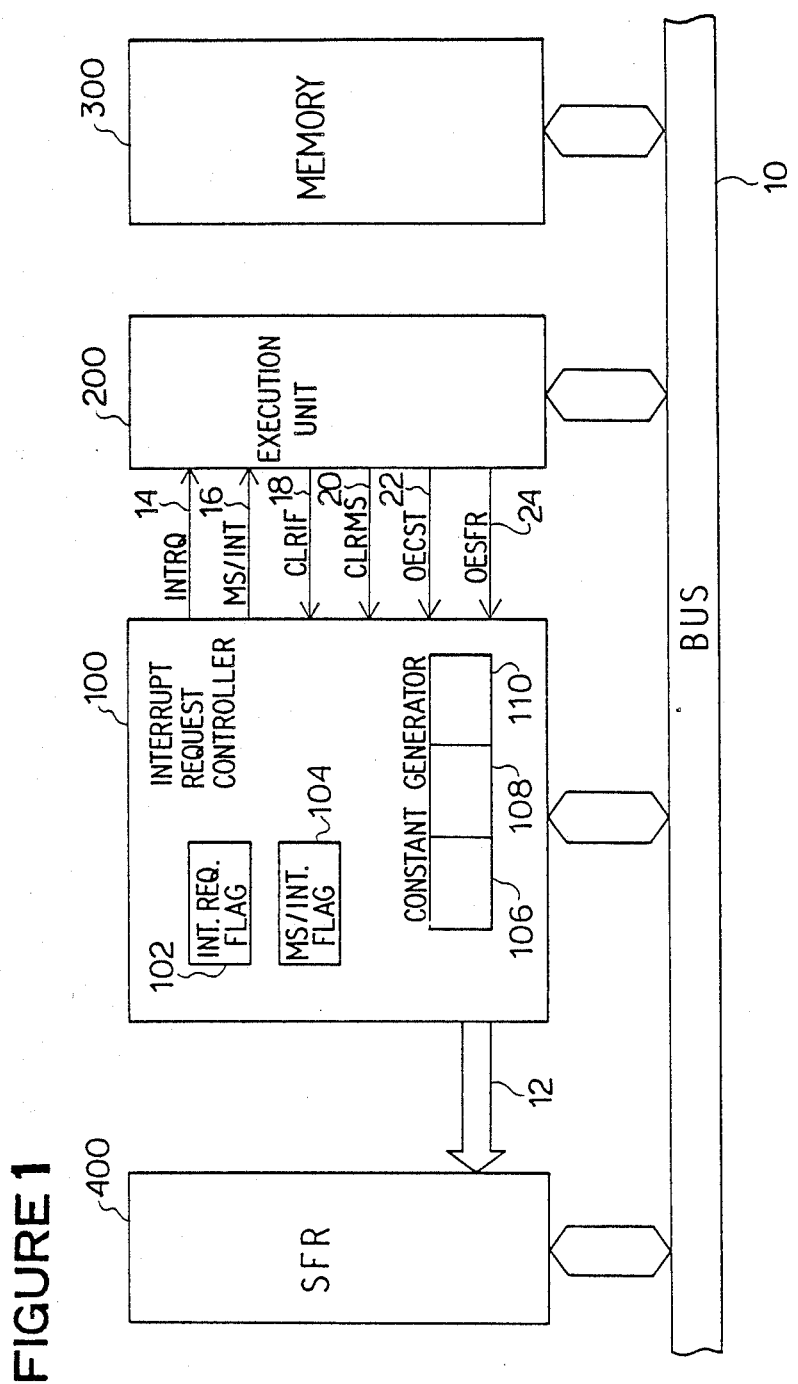
FIG. 1 is a block diagram of one embodiment of a data processor in accordance with the present invention.

Referring to FIG. 1, a data processor in accordance with the present invention comprises a bus 10, to which are coupled an interrupt request controller 100, an execution unit 200, a memory 300 including a read/write memory (RAM) and a special register unit (called "SFR" hereinafter) 400.

The interrupt request controller 100 generates a SFR address through a line 12 to the SFR 400, and an interrupt request INTRQ through a line 14 to the execution unit 200. Further, controller 100 also outputs through a line 16 to the execution unit 200 a mode designation MS/INT indicating whether the interrupt should be executed by the vector interrupt or by the macroservice. The controller 100 includes an interrupt request flag 102 set by an interrupt request from a peripheral device (not shown in FIG. 1), and a mode designation flag 104 storing the mode of the interrupt processing. Furthermore, the controller 100 includes a vector constant generator 106 for storing a value of a vector to be outputted in response to a request from the execution unit 200 when the interrupt processing is executed by the vector interrupt, and a macroservice channel register address constant generator 108 for storing an address information of the memory holding a designation information such as a content of processing, a direction of transfer, etc., in the macroservice so that the address information can be outputted in response to a request from the execution unit 200. In addition, there is provided a macroservice SFR address constant generator 110 storing an address information of the SFR 400 required for the macroservice, so as to output the SFR address information through the line 12 in response to a request from the execution unit 200.

On the other hand, the execution unit 200 generates a CLRIF signal indicating the completion of the vector interrupt processing of the execution unit so as to reset the instruction request flag 102, a CLRMS signal indicating the completion of the macroservice in the execution unit so as to clear the mode designation flag 104, an OECST signal requesting the output of the vector constant or the macroservice channel register address constant, and an OESFR signal requesting the output of the macroservice SFR address constant. These signals CLRIF, CLRMS, OECST and OESFR are outputted to the interrupt request controller 100 through lines 18, 20, 22 and 24, respectively.

If a processing request is generated from the peripheral device, and the interrupt request flag 102 is set, the controller 100 makes the INTRQ signal active, and at the same time, reads the content of the mode designation flag 104 to make the MS/INT signal active or inactive in accordance with the flag 104. In response to the active INTRQ signal, the execution unit interrupts the current program under execution and acknowledges the interrupt request. The execution unit 200 then executes the processing in one of the two modes in accordance with the level of the MS/INT signal.

In the case that the MS/INT signal is at a low level, the execution unit 200 executes the vector interrupt, similarly to the conventional processor. Specifically, the execution unit 200 makes the OECST signal active, so that the vector constant is read from the interrupt request controller 100 to the bus 10, and after a program counter, a program status word, registers, etc., are saved, the operation is branched to an interrupt processing program designated by the vector value.

Further, the execution unit 200 makes the CLRIF signal active so as to modify that the interrupt processing request has been grated, so that the interrupt request flag 102 is reset. As a result, the INTRQ signal is returned to an nonactive condition, and the processing is controlled in accordance with the designated interrupt processing program.

On the other hand, if a high level MS/INT signal is inputted to the execution unit 200, the interrupt processing is executed in the macroservice. In this case, the execution unit 200 makes the OECST signal active, so that the macroservice channel register address constant is read from the interrupt request controller 100 to the bus 10. On the basis of the address constant, a corresponding address in the memory 300 is accessed, and a content of the macroservice channel register is read out. As a result, there are obtained various items of information for the macroservice, such as a content of a processing performed the macroservice mode, the number of transfers, the directions of transfers, the word length, etc.

In the process of the macroservice, for example, if it becomes necessary to access to the SFR 400, as in case of data transfer between an internal RAM and SFR, the OESFR signal is made active, so that a corresponding register in the SFR 400 is accessed through the SFR address designations line 12, with the result that a corresponding processing is executed.

The macroservice processing is completed in two manners.

In a first manner, the CLRIR signal is made active so that the interrupt request flag 102 is reset. As a result, the INTRQ is made non-active. With this, the processing is completed. In this case, thereafter, if the interrupt processing request is generated, the macroservice processing is then performed again.

In a second manner, the CLRMS signal is made active so that the mode designation flag 104 is reset. Accordingly, the INTRQ signal is maintained active but the MS/INT signal is brought to the low level. With this, it is possible to shift the same interrupt request from the macroservice to the vector interrupt by sampling again the INTRQ signal at the time of completion of the macroservice processing. For example, suppose that an interrupt request is processed in the macroservice and a specific memory is used as a counter and is set with a termination condition for the processing. When the counter becomes a predetermined value (for example, zero), the CLRMS signal is made active so that the processing is shifted from the macroservice to the vector interrupt so as to make it possible to perform a complicated program control. To the contrary, if the counter does not reach the predetermined value, the CLRIF signal is made active so as to complete the interrupt processing. In this case, a next interrupt processing is performed in the macroservices again.

Here, it should be noted that the macroservice processing is exectued under control of the execution unit 200 through the bus 10, but, all the status and data is preserved. Accordingly, it has become unnecessary to save and restore the program counter, the program status word, registers, etc., which were required in the conventional interrupt processing. Further, since the address information of the SFR required in the execution of the macroservice is prepared in the interrupt request controller, even if it becomes necessary to read from the SFR 400 the data of a device which has generated the interrupt request and then to transfer it to the memory, the processing can be effectively performed at a high speed. This advantage could be easily understood by comparing the above method to the following case: If the SFR address information is stored in the memory 300, the address information of the memory storing the SFR address must be obtained from the information in the interrupt request controller or the macroservice channel register, and the memory is accessed in accordance with the address information thus obtained, so that the SFR address information is obtained. With this, it has become possible to access the SFR.

Figure 2:
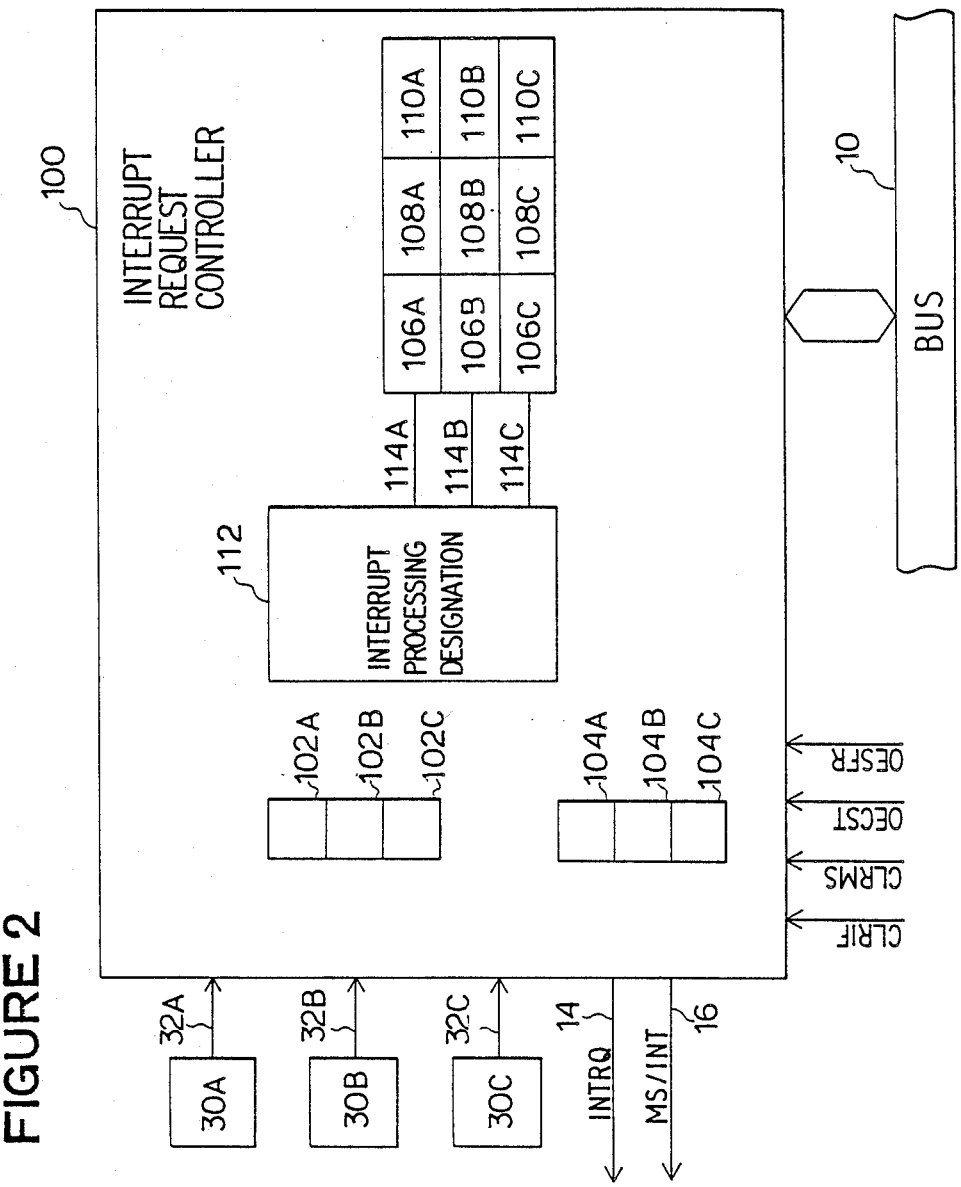
FIG. 2 is a block diagram of the interrupt request controller shown in FIG. 1.

Turning to FIG. 2, the interrupt request controller 100 is associated with for example three interrupt request sources 30A, 30B and 30C. Therefore, the controller 100 includes three interrupt request flags 102A, 102B and 102C and three mode designation flags 104A, 104B and 104C, respectively, in correspondence to the three interrupt request sources 30A, 30B and 30C. Further, the controller 100 includes three vector constant generators 106A, 106B and 106C, three macroservice channel register address constant generators 108A, 108B and 108C, and three macroservice SFR address constant generators 110A, 110B and 110C. The controller 100 also includes an interrupt processing designation circuit 112, which checks the contents of the interrupt request flags and selects only one interrupt request having the highest priority among the concurrently occurring interrupt requests. When the setting of the instruction request flags is detected, the circuit 112 generates the active INTRQ signal, and outputs the MS/INT signal in accordance with the mode designation flag corresponding to the selected interrupt request having the highest priority. Further, the circuit 112 generates a selection signal 114A, 114B or 114C to one of the generator series 106A, 108A and 110A, 106B 108B and 110B and 106C, 108C and 110C corresponding to the interrupt request source having the highest priority. Incidentally, the content of the mode designation flags 104A, 104B and 104C are beforehand set by a software on the basis of the content and type of respective required data processings corresponding to the interrupt request sources.

Now, if interrupt requests are generated by the three interrupt request sources 30A, 30B and 30C, these interrupt requests are inputted to the controller 100, and the corresponding interrupt request flag 102A, 102B and 102C are set. In this condition, the interrupt processing designation circuit 112 selects one interrupt request having the highest priority among the concurrently occurring interrupt requests and makes only a corresponding selection signal active. As a result, the MS/INT signal is made active or non-active in accordance with the content of the mode designation flag selected by the selection signal. The MS/INT signal thus formed and the active INTRQ signal are inputted to the execution unit 200.

Figure 3:
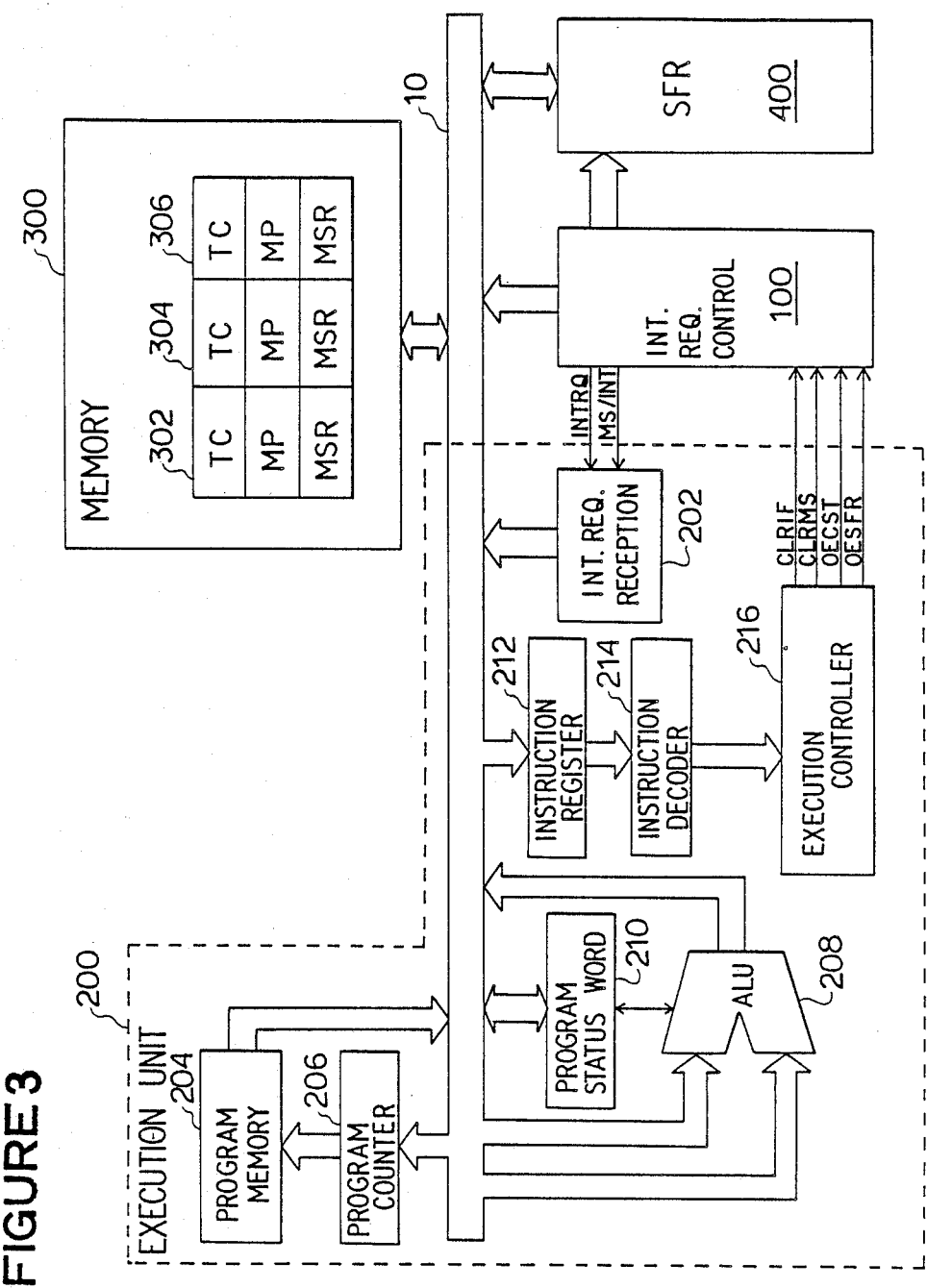
FIG. 3 is a detailed block diagram of the execution unit and the memory shown in FIG. 1.

Referring to FIG. 3, the execution unit 200 is shown in more detail. The execution unit 200 includes an interrupt request receiving circuit 202 receiving the INTRQ signal and the MS/INT signal from the interrupt request controller 100. This receiving circuit 202 is coupled at its output to the bus 10. Further, the execution unit 200 includes a program memory 204 storing various programs including interrupt processing programs, a program counter 206 indicating an address of a program to be executed next, an arithmetic and logic unit 208, a program status word 210 indicating the operation status of the whole execution unit, an instruction register 212 holding an instruction to be executed, an instruction decoder 214 decoding the content of the instruction register 212, and an execution controller 216 receiving the decoded instruction for controlling the operation of the whole execution unit 200. The execution controller 216 also generates the CLRIF signal, the CLRMS signal, the OECST signal, and the OESFR signal in the case of the interrupt processing execution.

The memory 300 includes macroservice channel registers (called "MSR" hereinafter) storing the content of the macroservice processing in a coded form, and a plurality of registers used in the data transfer processing performed in the macroservice mode. Specifically, the registers includes memory pointers (called "MP" hereinafter) storing the address of the RAM as a register used in the macroservice, and terminal counter (called "TC" hereinafter) storing the number of transferring. The MSR, MP and TC constitute one register group for the macroservice, and in this embodiment, the memory 300 includes three register groups 302, 304 and 306.

In a normal program processing, an instruction stored in the program memory 204 corresponding to the content of the program counter 206 is read out and then transferred to the instruction register 212. The instruction code latched in the instruction register 212 is decoded by the instruction decoder 214, and the execution controller 216 controls various circuits in the execution units on the basis of the decoded instruction, so that the instruction is executed. Each time one instruction is executed, the content of the program counter 206 is updated (or incremented) to indicate the address of an instruction to be executed.

On the other hand, if the INTRQ signal is made active, the interrupt request receiving circuit 202 causes to stop the execution of the program, and then, samples the level of the MS/INT signal. When the MS/INT signal is at a low level, the receiving circuit 202 judges that the interrupt request is the vector interrupt, and controls the execution controller 216 to cause it to output the OECST signal to the interrupt request controller 100, so that the vector value is read out and a branch address information is obtained. Further, the contents of the program counter 206 and the program status word 210 are saved to the memory 300, and thereafter, a head address of a corresponding interrupt processing program is transferred to the program counter 206, so that the interrupt processing program is started. If the execution of the interrupt processing program is completed, the information saved to the memory 300 is returned to the program counter 206 and the program status word 210, so that the processing of the interrupted program is restarted.

If the MS/INT signal is at a high level, the interrupt request receiving circuit 202 recognizes that the interrupt request is the macroservice, and so, causes the execution controller 216 to generate the OECST signal to the interrupt request controller 100. Thus, the MSR is accessed on the basis of the data outputted from the interrupt request controller 100 while maintaining the values of the program counter 206 and the program status word 210. Here, assume that the register groups 302, 304 and 306 correspond to the interrupt request sources 30A, 30B and 30C, respectively. Also assume that the interrupt request source 30A is selected as having the highest priority in the interrupt request controller 100. In this case, the address information of the MSR outputted in response to the OECST signal indicates the MSR in the register group 302. The execution controller 216 reads the content of the MSR concerned, and obtains information required for the macroservice of the interrupt request source 30A.

Now, assuming that the content of the macroservice designates a data transfer from the memory to the SFR, the execution controller 216 reads the data held in the address MP of the register group 302, and further, sends the OESFR signal to the interrupt request controller 100, so that the address information of the SFR is obtained from the interrupt request controller 110. Thus, the content read from the MP is written to a register of the SFR 400 designated by the SFR address information. Namely, the data transfer is completed. Accordingly, it is not necessary to stop the operation of the execution unit in the course of the macroservice processing. Thereafter, the execution controller 216 controls the ALU 208 to increment the value of the MP by "1" so as to return the incremented value to the MP or to decrement the content of the TC by "1" so as to return the decrement value to the TC. With this, a series of data transfer processing is completed.

If the content of the TC becomes zero as the result of decrement, the CLRMS signal is outputted to the interrupt request controller 100 so that there is cleared the mode designation flag corresponding to the interrupt request source 30A which had generated the above mentioned macroservice processing. On the other hand, if the TC is not zero, all the interrupt processing is regarded as having been completed, and the CLRIF signal is outputted to the interrupt request controller 100, so that there is cleared the interrupt request flag corresponding to the interrupt request source 30A which had generated the macroservice processing. With the above mentioned series of processings, the macroservice processing is completed. But, in the case of TC=0, only the mode designation flag is cleared, and the interrupt request flag is maintained in the set condition. Accordingly, this means that the interrupt request is continuously generated after the completion of the macroservice, and so, the interrupt processing is started, so that the data which has been transferred by the macroservice is processed in a vector interrupt processing corresponding to the interrupt request source 30A.

Figure 4:
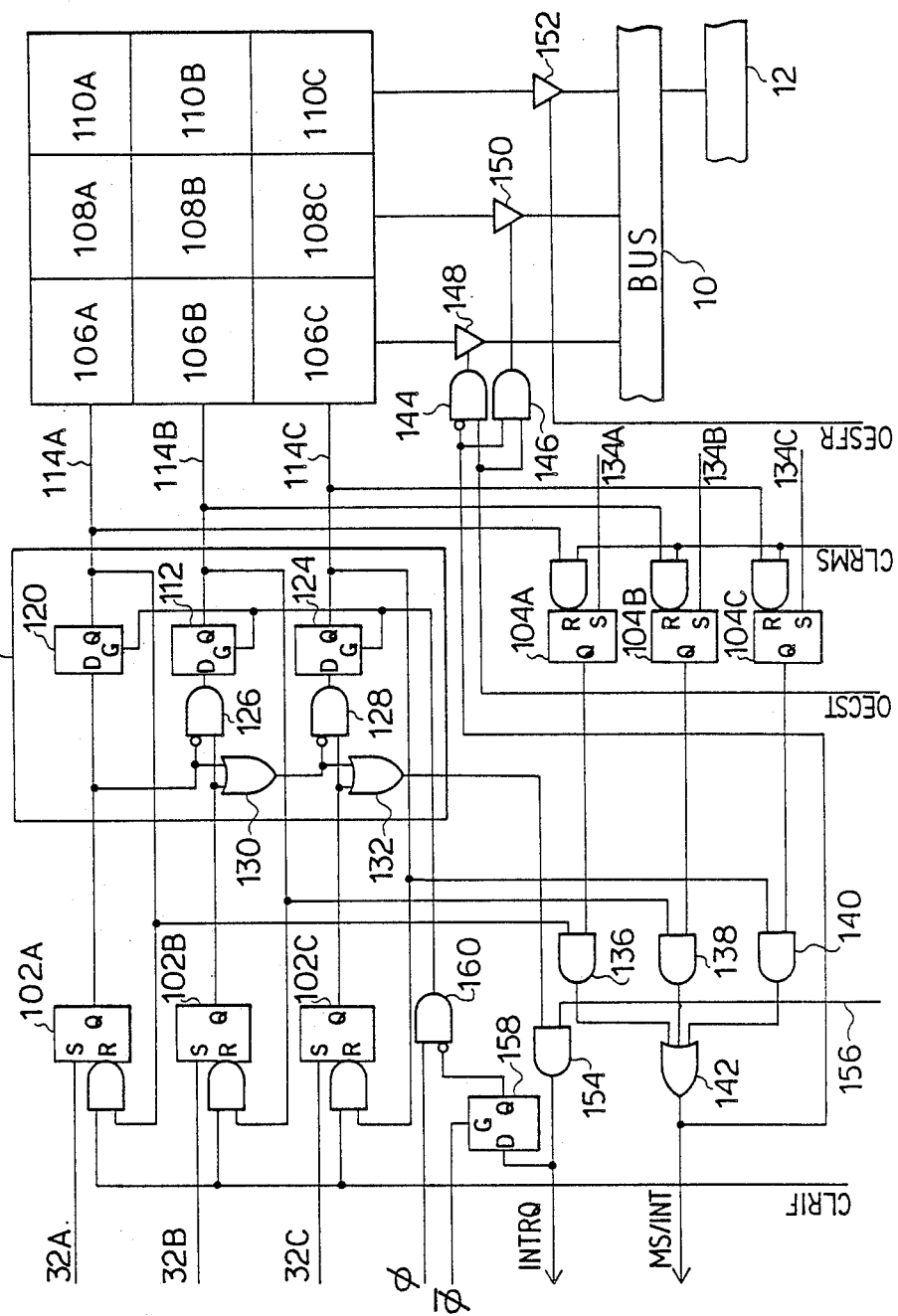
FIG. 4 is a logic circuit diagram of the interrupt request controller.

Turning to FIG. 4, the interrupt request controller 100 is shown in detailed form. As shown in FIG. 4, the three interrupt request flags 102A, 102B and 102C respectively include R/S flipflops receiving at their set inputs the signals 32A, 32B and 32C from the interrupt request sources 30A, 30B and 30C so that the flipflops are set when the signals from the corresponding interrupt request source 30A, 30B and 30C are brought to a high level. Each of the flipflops 102A, 102B and 102C receives at its reset input through an associated AND gate the CLRIF signal.

Each Q output of the flipflops 102A, 102B and 102C are connected to the interrupt processing designation circuit 112, which includes three latches 120, 122 and 124. A first latch 120 receives at its D input the Q output of the corresponding flipflop 102A, and a Q output of the latch 120 is connected to the AND gate associated to the corresponding flipflop 102A and also as the selection signal 114A to the group of the constant generators 106A, 108A and 100A. A second latch 122 received at its D input through AND gate 126 the Q output of the corresponding flipflop 102B and an inverted signal of the Q output of the flipflop 102A. A Q output of the latch 122 is connected to the AND gate associated to the corresponding flipflop 102B and also as the selection signal 114B to the group of the constant generators 106B, 108B and 110B. A third latch 124 has a D input connected to an output of an AND gate 128 whose first input is connected to the Q output of the corresponding flipflop 102C and whose second inverting input is connected to receive through an OR gate 130 to the Q outputs of the other flipflops 102A and 102B. A Q output of the latch 124 is connected to the AND gate associated to the corresponding flipflop 102C and also as the selection signal 114C to the group of the constant generators 106C, 108C and 110C. As seen from the construction of the circuit 112, the interrupt request source 30A has the highest priority and the interrupt request source 30C has the lowest priority.

The mode designation flags 104A, 104B and 104C respectively include R/S flipflops receiving at their set inputs setting signals 134A, 134B and 134C, respectively. Each of these flipflops 104A, 104B and 104C receives at its reset input through an associated AND gate the CLRMS signal and the Q output of the corresponding latch in the circuit 112. Q outputs of the respective flipflops 104A, 104B and 104C are connected to one inputs of three AND gates 136, 138 and 140, respectively. The other inputs of these AND gates are connected to the Q outputs of the corresponding latches in the circuit 112, respectively. Outputs of the AND gates 136, 138 and 140 are inputted to an OR gate 142 whose output generates the MS/INT signal.

This MS/INt signal is coupled to an inverting input of an AND gate 144 and a non-inverting input of another AND gate 146. The other inputs of these AND gates are connected to receive the OECST signal. An output of the AND gate 144 is connected to a control input of a tristate buffer connected between the bus 10 and the group of the vector constant generators 106A, 106B and 106C. An output of the AND gate 146 is connected to a control input of another tristate buffer 150 connected between the bus 10 and the group of the macroservice channel register address constant generators 108A, 108B and 108C. A third tristate buffer 152 is connected between the bus 10 and the group of the macroservice SFR address generators 110A, 110B and 110C. A control input of this tristate buffer 152 is connected to receive the OESFR signal.

Further, the interrupt processing designation circuit 112 also includes an OR gate 132 receiving at its one input the output of the OR gate 130 and at its other input the Q output of the flipflop 102C. An output of the OR gate 132 is connected to one input of an AND gate 154, whose other input is connected to receive an interrupt request enable signal 156. Thus, if the enable signal 156 is at a high level and if at least one of the interrupt request flags 102A, 102B and 102C is set, and AND gate 154 generates at its output the active INTRQ signal.

The output of the AND gate 154 is also connected to a D input of a latch 158, whose Q output is connected to an inverting input of an AND gate 160. A pair of clock signal $\phi$ and $\bar{\phi}$ are supplied to a non-inverting input of the AND gate 160 and a G input of the latch 158, respectively. An output of the AND gate is connected to a G input of the respective latches in the circuit 112.

Now, operation will be explained on the case that the interrupt request flag 102A is set when the interrupt request enable signal 156 is at a high level and the mode designation flag 104 is in a reset condition.

At an initial status, the INTRQ signal is at a low level, and so, the Q output of the latch 158 is at a low level. Therefore, the output of the AND gate 160 is brought into a high level in synchronism with the clock $\phi$, so that the output of the instruction request flag 102A is latched in the latch 120. As a result, the selection signal 114A is brought to a high level. At the same time, the content of the instruction request flag 102A is supplied through the OR gates 130 and 132 to the AND gate 154. At this time, since the interrupt request enable signal 154 is at a high level as mentioned above, the AND gate 154 generates the INTRQ signal of a high level to the execution unit 200. Further, as the result of the high level INTRQ signal generation, the output of the latch 158 is brought into a high level, and so, the output of the AND gate 160 is maintained at a low level, so that the latches 120, 122 and 124 continue to maintain the respective outputs as they are. This condition will not change until the INTRQ signal is made to be a low level again.

On the other hand, since the mode designation flag 104A is in the reset condition as mentioned above, the AND gate 136 generates a low level output. Further, since the selection signal 114B and 114C are at a low level, the AND gates 138 and 140 also generate a low level outputs. Therefore, the OR gate 142 generates a low level MS/INT signal, which instructs the vector interrupt (i.e., the conventional interrupt processing) to the execution unit.

As soon as the execution unit 200 detects that the INTRQ signal becomes a high level, the execution unit 200 interrupts the current program under execution, and enters the interrupt processing. The execution unit samples the MS/INT signal and detects that the MS/INT signal is at a low level. Specifically, the execution unit 200 recognizes that the interrupt request is the vector interrupt, and therefore, starts the interrupt operation such as the saving of the program counter and the program status word.

After the interrupt processing is started, the execution unit 200 makes the OECST signal active so that the AND gate 144 output a high level signal to activate the tristate buffer 148. Since the vector constant generator 106A is selected by the selection signal 114A, the content of the vector constant generator 106A is transferred through the bus 10 to the execution unit 200. At this time, since the MS/INT signal is at a low level, the output of the AND gate 146 is also at a low level, so that the tristate buffer 150 is at a high impedance condition.

Thus, the execution unit 300 fetches the vector value through the bus 10, and controls the execution controller 216 to branch to an address corresponding to the fetched data and to start the execution of the interrupt processing program. At the same time, the execution unit 200 brings the CLRIF signal to a high level, which indicates the completion of the processing of the interrupt request, so that the instruction request flag 102 selected by the selection signal 114A is reset. After the series of interrupt processing programs are completed, the saved information is restored to the program counter and the program status word, so that the execution of the interrupted program is restarted.

Next, explanation will be made on operation in the case that the interrupt request flag 102A is set when the interrupt request enable signal 156 is at a high level and the mode designation flag 104A is in a set condition by means of a software.

At the initial state, since the INTRQ signal is at a low level, a latch clock is supplied to the latches 120, 122 and 124, similarly to the first case. Therefore, the output of the interrupt request flag 102A is latched in the latch 120, so that the selection signal 114A is brought into a high level. At this time, the selection signals 114B and 114C are brought into a low level without regard to the content of the interrupt request flag 102B and 102C. At the same time, the content of the flag 102A is supplied through to OR gates 130 and 132 to the AND gate 154. Since the interrupt request enable signal 154 is at a high level as mentioned above, the AND gate 154 generates the INTRQ signal of a high level to the execution unit 200. Further, as the result of the high level INTRQ signal generation, as mentioned above the latches 120, 122 and 124 are put in the output maintaining condition until the INTRQ signal is returned to the low level.

On the other hand, since the mode designation flag 104A is in a set condition as mentioned above, the AND gate 136 generates a high level output. Therefore, the OR gate 142 generates a high level MS/INT signal requiring the macroservice processing.

As soon as the execution unit 200 detects that the INTRQ signal becomes a high level, the execution unit 200 interrupts the current program under execution, and enters the interrupt processing. The execution unit samples the MS/INT signal and detects that the MS/INT signal is at the high level. Namely, the execution unit 200 recognizes that the interrupt request is the macroservice, and starts the macroservice.

After the macroservice is started, the execution unit 200 makes the OECST signal active so that the AND gate 146 output a high level signal to activate the tristate buffer 150. Since the macroservice channel register address constant generator 108A is selected by the selection signal 114A, the content of the macroservice channel register address constant generator 108A is transferred through the bus 10 to the execution unit 200.

Thus, the execution unit 200 fetches the vector value through the bus 10, and reads out the macroservice channel register of the memory 300 on the fetched data so as to obtain control information such a the type of the macroservice processing, the direction of transfer, the word length, etc. Then, the execution unit executes the macroservice processing on the basis of the read-out control information for the macroservice.

In the case that the data transfer between the RAM and the SFR is designated, the OESFR signal is brought into a high level, so that an SFR address information is outputted from the macroservice SFR address constant generator 110A to the SFR address designation line 12. With this, the data transfer is made between the designated register in the SFR and the RAM designated by the MP. Thereafter, the increment of the MP and the decrement of the TC are executed. If the result of decrement of the TC becomes zero, the CLRMS signal is made to a high level, so that the mode designation flag 104A selected by the selection signal 114A is reset. At the clearing of the flag 104A, the output of the AND gate 136 is brought to a low level. At this time, since the outputs of the AND gates 138 and 140 are at a low level, the output of the OR gate 142, i.e., the MS/INT signal is brought to a low level. But, since the interrupt request flag 102A is still in the set condition, the INTRQ signal is maintained at a high level.

Accordingly, after a series of macroservice processings are completed, the execution unit detects that the INTRQ signal is at a high level and the MS/INT signal is at a low level, and then starts the interrupt processing, i.e., the vector interrupt. If the TC is not zero, the execution controller brings the CLRIF signal to a high level so that the interrupt request flag 102A is reset. With this, the INTRQ signal is brought to the low level, so that the macroservice processing is completed. In this case, if an interrupt request is next generated from the interrupt request source, the macroservice processing is performed again.

In the above embodiment, the priority order is fixed. But, the embodiment can be modified to comply with interrupt requests having variable priority order. In addition, if the control information stored in the macroservice channel register includes a data comparison function, a high degree of processing can be executed in the macroservice without adding a special hardware. Specifically a data processor having a high feasibility can be obtained.

Figure 5:
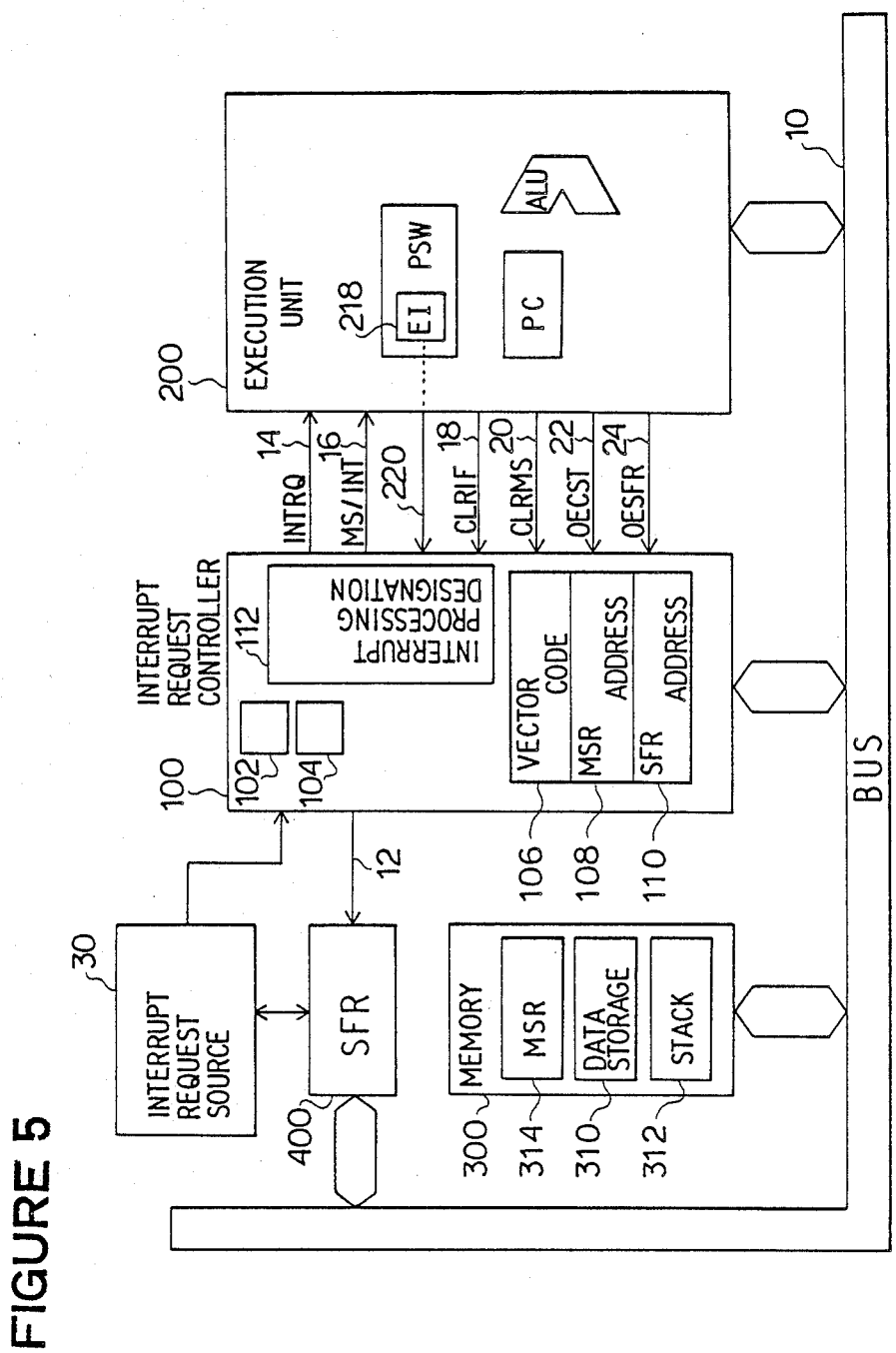
FIG. 5 is a block diagram of a second embodiment of the data processor.

Referring to FIG. 5, there is another embodiment of the data processor in accordance with the present invention. In FIG. 5, circuits and portions similar to those in the first embodiment shown in FIGS. 1 to 4 are given the same Reference Numerals, and explanation will be omitted.

As seen from comparison between FIG. 5 and FIGS. 1 to 4, the second embodiment includes an interrupt enable flag (EI flag) 218 provided in the program status word in the execution unit 200. The execution unit 200 outputs an EI signal based on the EI flag 218 to the interrupt request controller 100. Further, the SFR 400 is directly coupled to the interrupt request source 30.

Next, operation will be explained on the embodiment shown in FIG. 5.

If the instruction request flag 102 is set, the interrupt request controller 100 checks the content of the EI flag 218 and the content of the mode designation flag 104 corresponding to the interrupt request source generating the interrupt request, so that the interrupt request controller determines the order of priority and the condition of the interrupt processing. As a result, the interrupt request controller generates the INTRQ signal and the MS/INT signal to the execution unit 200.

The INTRQ signal and the MS/INT signal assume the following three combinations.

It is a first case that the mode designation flag 104 is reset and the EI flag 218 is reset to indicate that the interrupt request is not accepted. At this time, the INTRQ signal and the MS/INT signal are at a low level, i.e., in a non-active condition. As a result, the interrupt request flag 102 is retained in the set condition.

A second case is that the EI flag 218 is set to allow an interrupt and the mode designation flag 104 is reset. In this situation, the vector interrupt processing is performed in a similar manner to that of the first embodiment.

A third case is that the mode designation flag 104 is set. In this case, both the INTRQ signal and the MS/INT signal are rendered active, i.e., to a high level, regardless of the content of the EI flag 218. Namely, the macroservice processing is performed similarly to the first embodiment.

Specifically, the execution unit 200 makes the OECST signal active, so that the address information of the MSR 314 corresponding to the interrupt request source is outputted from the macroservice channel register address constant generator 108 to the bus 10. Further, the MSR 314 in the memory read out on the basis of the read-out MSR address information, so that the content (the address and the type of data processing) of the macroservice processing is obtained. With this, the macroservice processing is started.

Now, assume that the designated macroservice is to set a mode setting data to the SFR 400 in correspondence to the interrupt request generating source. In this case, the execution unit succeedingly generates the active OESFR signal, so as to cause the SFR address constant generator 110 to output the SFR address information corresponding to the interrupt request generating source. The SFR address is supplied through the SFR address designation line 12 to the SFR 400. At the same time, data is transferred to the SFR 400 through the bus 10 from the data storage area 310 in the memory designated by the content of the MSR 314, so that the data is stored in the SFR 400 at the designated SFR address.

To the contrary, if the content of the macroservice is to transfer the content of the SFR 400 corresponding to the interrupt request generating source, to the data storage area 310 in the memory 300, similarly the execution unit 200 causes the interrupt request controller 100 to output the SFR address constant from the SFR address constant generator 110 through the SFR address designation line 12 to the SFR 40, so that data is read from the designated SFR address. The read-out data is transferred to the data storage area 310 in the memory designated by the content of the MSR 314.

The macroservice can be terminated in the two manners explained with reference to the first embodiment.

Here, a detailed explanation will be made on the case that the vector interrupt is started after a predetermined number of macroservice data transfers have been executed. If this method is used, for example, data averaging processing or calculating processing can be executed in the interrupt program performed just after the macroservice operation.

In this case, in the data storage area 310 there are assigned a transfer data buffer area, a point indicating the address of the transfer buffer area (called "MP" in the specification), and a counter memory for counting the number of the transfers (called "TC" in the specification). The address information of the MP and the TC is designated by the content of the MSR 314, and the number of transfers is previously set to the TC by a program process. The sequence starting the macroservice is the same as the above mentioned example, but the buffer area for the transfer area used in the data transfer processing is designated by the content of the MP.

After the data transfer is completed between the SFR and the memory designated by the content of the MP, the execution unit 200 successively increments the content of the MP by "1" and decrements the content of the TC by "1" so as to store the respective incremented and decremented results to the MP and TC. Then, the execution unit checks whether or not the content of the TC is zero ("0"). If the TC is not zero, the execution unit makes the CLRIF signal active to cause to reset the interrupt request flag 102 corresponding to the interrupt request generating source, so that the INTRQ signal is brought to a non-active, i.e., low level. With this, a macroservice is completed. On the other hand, if TC=0, the execution unit 200 makes the CLRMS signal active to cause to reset the mode designation flag 104, and maintains the instruction request flag 102 in the set condition. With this condition, the macroservice is completed. As a result, if the EI flag 218 is set, since the INTRQ signal is active and the MS/INT signal nonactive, the execution unit 200 successively starts the vector interrupt processing. If the EI flag 218 is in a reset condition (because it is in the course of the execution of an application program avoided from deepening the stack), the INTRQ signal is maintained non-active. Therefore, the interrupt request 102 is maintained in the set condition to preserve the vector interrupt, but the macroservice is completed.

Figure 6:
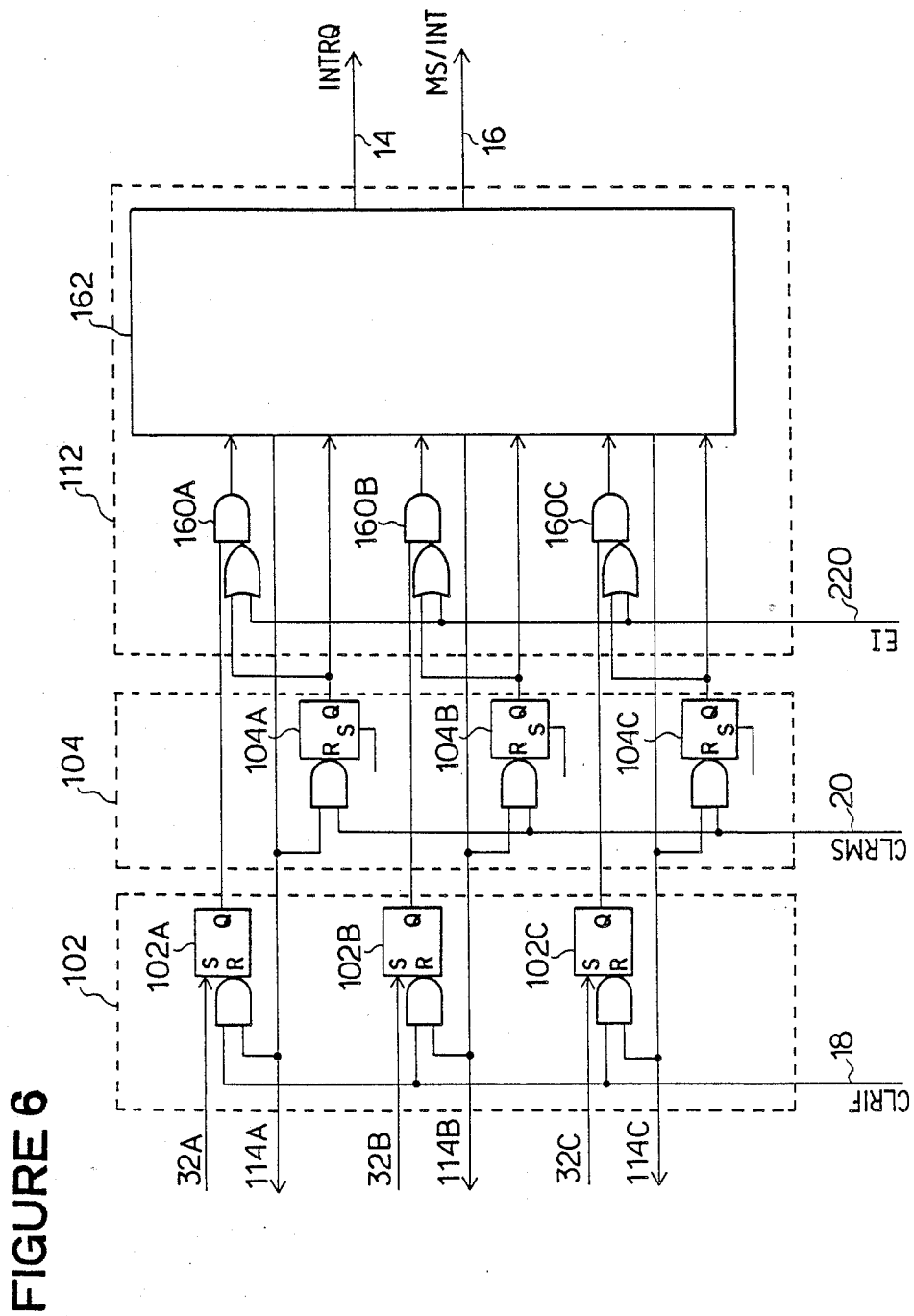
FIG. 6 is a detailed circuit diagram of the interrupt request controller shown in FIG. 5.

Turning to FIG. 6, there is shown a logic circuit diagram of the interrupt request flag 102, the mode designation flag 104 and the interrupt processing designation circuit 112 shown in FIG. 5. In FIG. 6, elements similar to those shown in FIG. 4 are given the same Reference Numerals, and explanation will be omitted.

As seen from comparison between FIGS. 4 and 6, the circuit shown in FIG. 6 includes three AND-OR logics 160A, 160B and 160C which respectively receive the interrupt request flags 102A, 102B and 102C, and the mode designation flags 104A, 104B and 104C, and which also commonly receive the EI flag signal. An output of each of the AND-OR logics is connected to a priority order control circuit 162, which can be composed of for example a system including the elements 120 to 132, 136 to 142, 154, 158 and 160 as shown in FIG. 4.

The circuit shown in FIG. 6 will operate similarly to the system shown in FIG. 4, in the case of the EI flag signal 220 being at a high level.

If the mode selection flag 104 is set, the corresponding AND-OR logic will be maintained in an open condition regardless of the level of the EI flag signal. For example, when the mode designation flag 104A is set, if the instruction request flag 102A is set, and AND-OR logic 160A generates a high level output regardless of the EI flag signal. The priority order control circuit 162 selects a logic having the highest priority from among the AND-OR logics generating the high level output, and brings a corresponding selection signal (114A, 114B, 114C) to a high level. In this example, since only the AND-OR 160A outputs the high level signal, the selection signal 114A is made to a high level. Further, the priority order control circuit 162 brings the INTRQ signal to a high level, so as to modify the interrupt request to the execution unit. Further, the control circuit 162 outputs as the MS/INT signal the content of the mode designation flag 104A corresponding to the selection signal 114A. Namely, since the flag 104A is set, the MS/INT signal is at a high level.

Thus, the execution unit detects the INTRQ signal =high level and the MS/INT signal =high level, and executes the macroservice. This macroservice will be executed similarly to those which have been explained hereinbefore.

At the completion of the macroservice the execution unit outputs the high level CLRIF, so that the interrupt request flag 102A, the AND-OR gate 160A, the selection signal 114A and the INTRQ signal are brought to a low level. At this time, if the execution unit outputs the high level CLRMS signal in place of the CLRIF signal, only the mode designation flag 104A selected by the selection signal 114 is reset, and the content of the interrupt request flag 102A is unchanged. Therefore, if the EI flag signal 220 is then at a high level, the output of the AND-OR logic 160A is maintained at a high level, so that the INTRQ signal is unchanged at a high level but the MS/INT signal is changed from the high level to the low level. As a result, the execution unit detects the INTRQ signal =high level and the MS/INT signal =low level, the execution unit successively executes the vector interrupt processing after the completion of the macroservice processing. If the EI flag signal is at a low level, the output of the AND-OR logic 160A is brought to a low level when the mode designation flag 104A is reset by the high level CLRMS signal from the execution unit. Accordingly, the selection signal 114A and the INTRQ signal are brought to a low level, and so, the macroservice processing is completed in such a condition that the interrupt request flag 102A is in a set condition.

In the case that the mode designation flag is in a reset condition and the EI flag signal is at a low level, the corresponding AND-OR logic maintains its output at a low level regardless of the content of the corresponding interrupt request flag. Accordingly, the interrupt request is not transferred to the priority order control circuit 162, and so, the interrupt request is preserved in the interrupt request flag.

Figure 7:
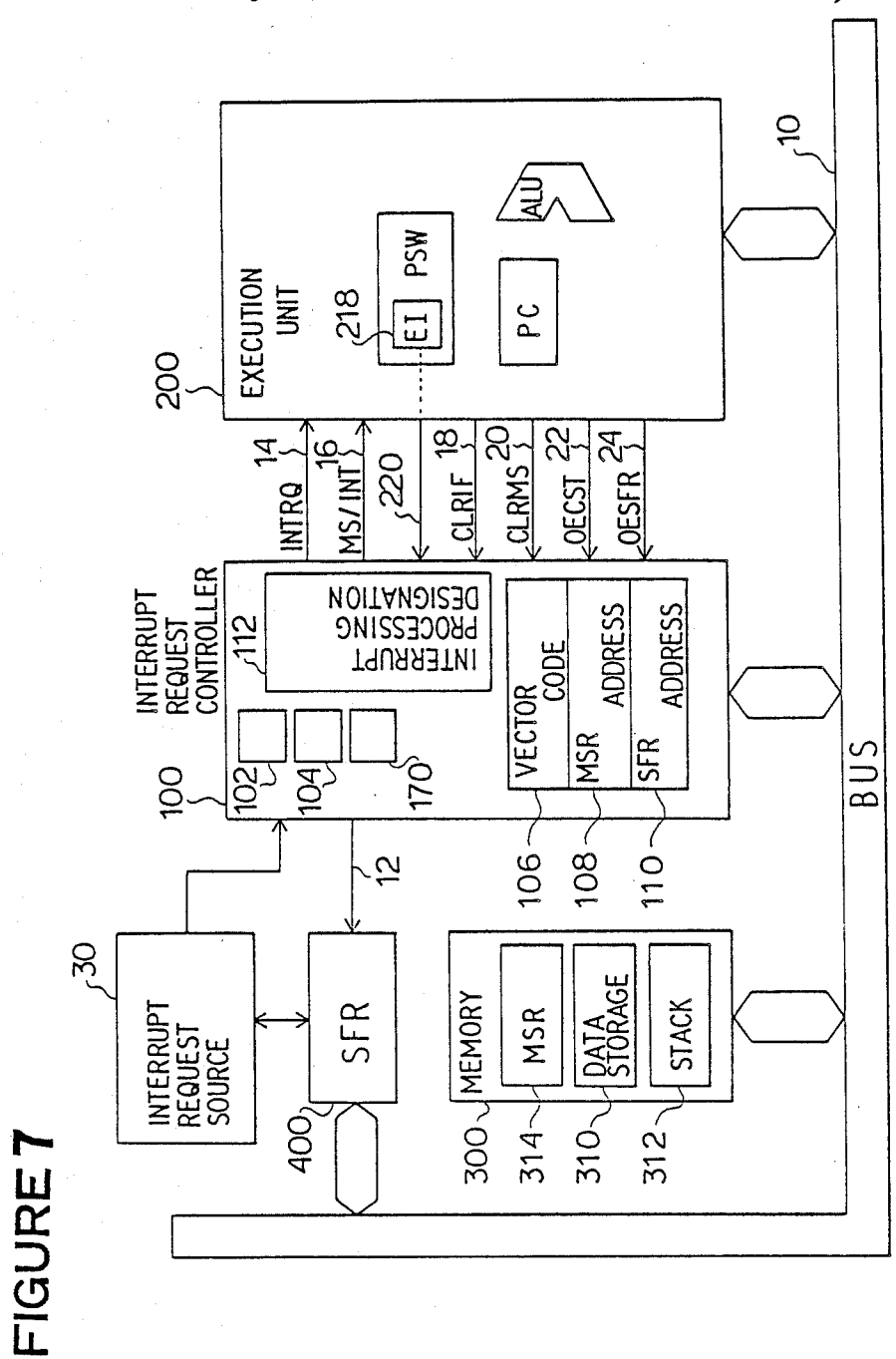
FIG. 7 is a diagram similar to FIG. 5 but showing a third embodiment of the data processor.
Figure 8:
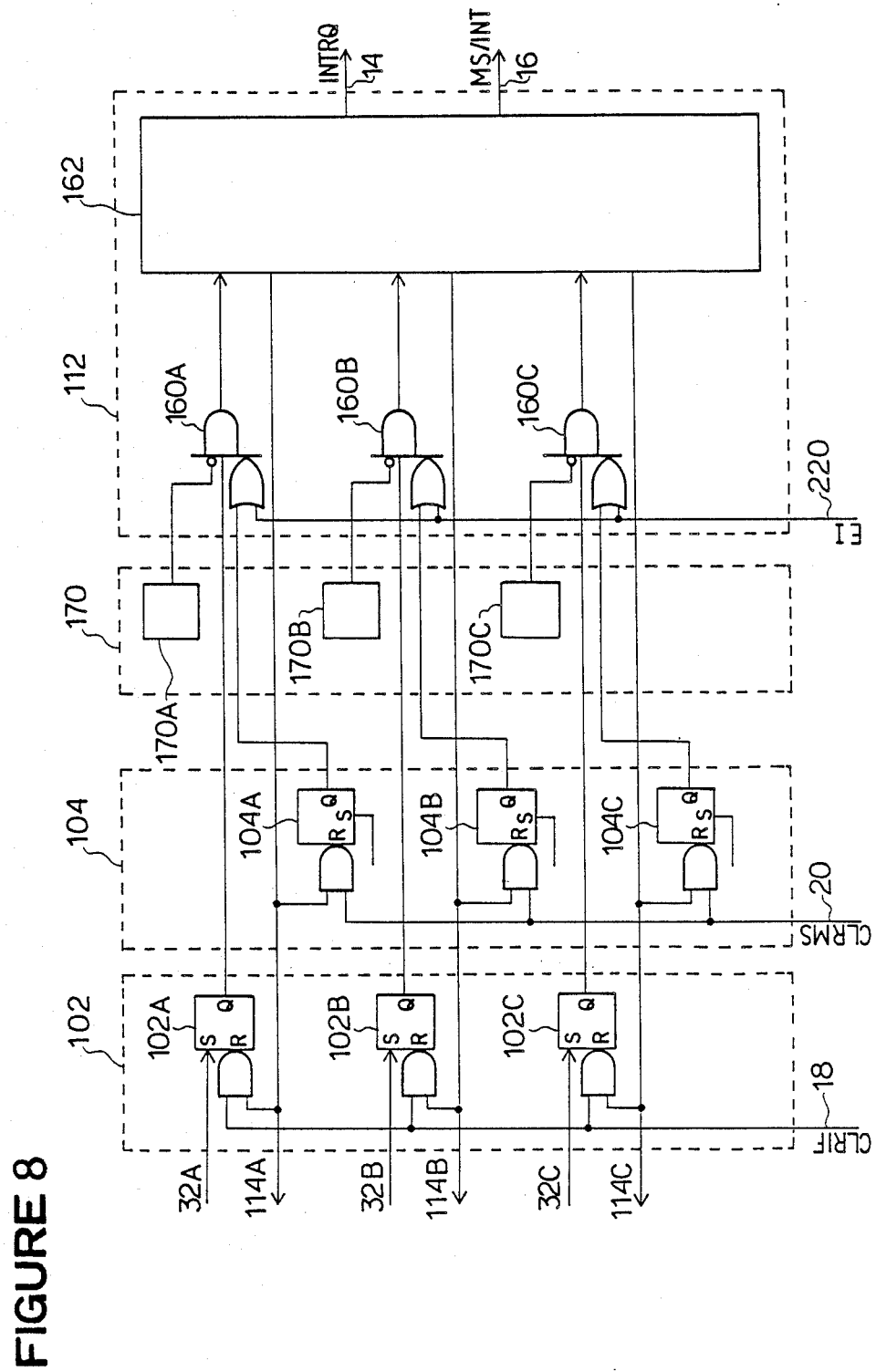
FIG. 8 is a diagram similar to FIG. 6 but showing the interrupt request controller shown in FIG. 7.

Turning to FIG. 7, there is shown a modification of the data processor shown in FIG. 5. Therefore, circuits similar to those shown in FIG. 5 are given the same Reference Numerals, and explanation will be omitted. The modified data processor is different from that shown in FIG. 5 only in one point that there is provided a group of interrupt mask flags 170 for controlling a refusal and allowance of the interrupt request acknowledgement. These mask flags 170 are located as shown in FIG. 8 which is a diagram similar to FIG. 6 but showing the corresponding portions of the embodiment shown in FIG. 7. Namely, interrupt mask flags 170A, 170B and 170C are provided one for each AND-OR logic. Each of the AND-OR logics 160A, 160B and 160C is connected at its inverting input to a corresponding interrupt mask flag.

As can be easily understood from FIG. 8, if the interrupt mask flags 170A, 170B and 170C is set to a high level, the associated AND-OR logic will maintain its output at a low level without regard to the contents of the corresponding interrupt request flag 102 and the corresponding mode designation flag 104 and the level of the EI flag signal.

In the embodiment shown in FIG. 5, it is possible to inhibit and allow the vector interrupt as the whole of the data processor by setting and resetting the EI flag. In the embodiment shown in FIG. 7, however, it is possible not only to inhibit and allow the vector interrupt as the whole of the data processor, but also to individually inhibit and allow an each pair of macroservice and vector interrupt by setting the interrupt mask flags individually. Therefore, in an application system having a plurality of interrupt request sources, it is possible to allow an interrupt processing only to a desired processing requests.

As seen from the above explanation, the data processor in accordance with the two interrupt processing mode, the vector interrupt and the macroservice. The macroservice is executed by a microprogram processing similar to an execution of a decoded instruction obtained from an ordinary instruction code. Therefore, the macroservice can be carried out without interferring with execution of an ordinary program operation, and without the saving and restoring of internal information required in the vector interrupt. The macroservice can be executed freely from the limited of the nesting caused by the capacity of the stack. Therefore, it is not necessary to allow or inhibit the interrupt processing request by the EI flag or the like, which are requested in the vector interrupt. In other words, it has become unnecessary to preserve a processing request from a processing request source needing a high speed data processing.

The invention has thus been shown and described with reference to the specific embodiments. However, it should be noted that the invention is in no way limited to the details of the illustrated structures but changes and modifications may be made within the scope of the appended claims.

We claim:

1. A data processor comprising:

an interrupt processing request controller receiving a processing request from at least one processing request generating source for generating an interrupt request, an execution unit including at least a program counter and a program status word and having a first mode of executing the interrupt processing in accordance with an user's program and a second mode of executing the interrupt processing in accordance with a microprogram while maintaining an internal condition of the execution unit including conditions of at least the program counter and the program status word and used for execution of a program, and a mode designation flag provided for one processing request generating source so as to designate whether the first mode or the second mode should be executed, the mode designation flag being selectively set or reset in accordance with a content of a processing request from the same processing request generating source, whereby, when the mode designation flag indicates the first mode, the controller operates to respond to the processing request from the processing request generating source so as to control the execution unit so that an execution of a program being executed is discontinued and contents of the program counter and the program status word when the execution of the program is executed are saved and thereafter a head address of an interrupt processing routine stored in the user's program is set to the program counter so that the interrupt processing routine is executed using the program counter and the program status word, and whereby, when the mode designation flag indicates the second mode, the controller operates to respond to the processing request from the processing request generating source so as to control the execution unit so that an execution of a program being executed is discontinued and an interrupt processing based on the processing request is executed by using the microprogram without saving contents of the program counter and the program status word and without using the user's program.

2. A data processor as claimed in claim 1, wherein the interrupt processing request controller includes an interrupt request flag set in response to a processing request, so that on the basis of the interrupt request flag and the mode designation flag the interrupt processing request controller causes the execution unit to execute the interrupt processing in the mode designated by the mode designation flag.

3. A data processor as claimed in claim 1, further including a special register unit for storing information for an interrupt processing execution in the second mode, and wherein the interrupt processing request controller has a constant generator for generating a signal the special register unit for designating the second mode interrupt processing execution information, so that when the second mode is designated, the interrupt processing request controller causes to read the second mode interrupt processing execution information from the special register unit on the basis of an output of the constant generator.

4. A data processor claimed in claim 1 wherein the execution unit includes an interrupt enable flag indicating whether or not an interrupt can be allowed by the execution unit, the interrupt processing request controller operating to respond to a content of the interrupt enable flag so as to selectively inhibit the execution of the interrupt processing in the first mode.

5. A data processor claimed in claim 1 wherein the interrupt processing request controller includes an interrupt request mask flag, the controller inhibiting the execution of the interrupt processing without exception when the mask flag is set.

6. A data processor as claimed in claim 1, wherein the interrupt processing request controller includes a plurality of interrupt request flags set in response to a processing request from a corresponding number of interrupt request sources, and a corresponding number of mode designation flags provided one for one of the interrupt request flags and designating whether the first mode or the second mode should be executed.

7. A data processor claimed in claim 6 further including a special register unit for storing information for an interrupt processing execution in the second mode for each of the interrupt request sources, and wherein the interrupt processing request controller has a constant generator for generating an address of the special register unit for each second mode interrupt processing execution information, so that when the second mode is designated for one interrupt processing request, the interrupt processing request controller causes to read the second mode interrupt processing execution information for the interrupt processing request from the special register unit on the basis of an output of the constant generator.

8. A data processor claimed in claim 7 wherein the execution unit includes as interrupt enable flag indicating whether or not an interrupt can be allowed by the execution unit, the interrupt processing request controller operating to inhibit all the execution of the interrupt processing in the first mode when the interrupt enable flag is set.

9. A data processor claimed in claim 8 wherein the interrupt processing request controller includes an interrupt request mask flag for each of the interrupt request sources, the controller inhibiting the execution of the interrupt processing for one interrupt request source without exception when the mask flag for the same interrupt request source is set.

10. A data processor comprising:
an interrupt processing request controller receiving processing requests from processing request generating sources for generating an interrupt request,
a memory for storing programs and data,
a special register unit including a plurality of registers used for controlling the processing request generating sources and/or buffering data transfer between the data processor and the processing request generating sources,
an execution unit including at least a program counter and a program status word and having a first mode of executing the interrupt processing in accordance with an user's program and a second mode of executing the interrupt processing in accordance with a microprogram while maintaining an internal condition of the execution unit including conditions of at least the program counter and the program status word and used for execution of a program,
a mode designation flag provided for one processing request generating source so as to designate whether the first mode or the second mode should be executed, the mode designation flag being selectively set or reset in accordance with a content of a processing request from the same processing request generating source,
control means for selectively inhibiting the execution of the interrupt processing in the first mode, and
means for designating the operation control of each of the processing request generating sources and an address of each register of the special register unit in the execution of the interrupt processing in the second mode,
whereby, when a processing request is outputted from a processing request generating source, if the mode designation flag corresponding to the processing request generating source indicates the first mode, the controller operates to respond to the same processing request so as to control the execution unit so that an execution of a program being executed is discontinued and contents of the program counter and the program status word when the execution of the program is executed are saved and thereafter a head address of an interrupt processing routine stored in the user's program is set to the program counter so that the interrupt processing routine is executed using the program counter and the program status word, and
whereby, when a processing request is outputted from a processing request generating source, if the mode designation flag corresponding to the processing request generating source indicates the second mode, the controller operates to respond to the same processing request so as to control the execution unit so that an execution of a program being executed is discontinued and an interrupt processing based on the processing request is executed by using the microprogram without saving contents of the program counter and the program status word and without using the user's program but referring to the address of a register of the special register unit corresponding to the processing request generating source.

11. A data processor claimed in claim 10 further including means for inhibiting the execution of the interrupt processing without exception.

12. A data processor comprising:
an interrupt processing request controller receiving processing requests from processing request generating sources for generating an interrupt request,
a memory for storing programs and
an execution unit including at least a program counter and a program status word and having a first mode of executing the interrupt processing in accordance with an user's program and a second mode of executing the interrupt processing in accordance with a microprogram while maintaining an internal condition of the execution unit including conditions of at least the program counter and the program status word and used for execution of a program, and a special register including a plurality of registers used for controlling the processing request generating sources and/or buffering data transfer between the data processor and the processing request generating sources;

said interrupt request controller comprising:

(1) an interrupt request flag provided for each of the processing request generating sources so as to indicate the existence of an interrupt processing request from the corresponding processing request generating source, (2) a mode designation flag provided for each of the processing request generating sources so as to designate whether the first mode or the second mode should be selected for the interrupt processing, said mode designation flag being selectively set or reset in accordance with a content of a processing request from the same processing request generating source, (3) first means for supplying an address of the program in the memory to be executed in the first mode, (4) second means for an address of the microprogram held in the special register for the interrupt processing in the second mode, and (5) third means for supplying an address of data held in the special register necessary for the execution of the interrupt processing in the second mode, whereby when the interrupt request controller generates on the basis of the two flags an interrupt request signal and a first mode signal to the execution unit, the execution unit outputs a signal to the interrupt request controller to the effect that an execution of a program being executed is discontinued and contents of the program counter and the program status word when the execution of the program is executed are saved and thereafter the first means outputs a head address of an interrupt processing routine stored in the user's program and to be executed in the first mode so as to be set to the program counter so that the execution unit executes, by using the program counter and the program status word, the interrupt processing in accordance with the interrupt processing routine program read from the memory on the basis of the head address, the execution unit operating to output, when the interrupt processing in the first mode has been completed, a first clear signal to the interrupt request flag, and when the interrupt request controller generates on the basis of the two flags an interrupt request signal and a second mode signal to the execution unit, the execution unit outputs a signal to the interrupt request controller to the effect that an execution of a program being executed is discontinued and the second means outputs the address of the microprogram held in the special register and the execution unit outputs another signal to the interrupt request controller so as to cause the third means to output the address of the data held in the special register so that the execution unit executes, without saving contents of the program counter and the program status word and without using the user's program, the interrupt processing in accordance with the microprogram read from the special register on the basis of the address outputted from the second means, for the data read from the special register on the basis of the address outputted from the third means, the execution unit operating to output, when the interrupt processing in the second mode has been completed, a second clear signal to the mode designation flag.

* * * * *